US007114169B1

(12) United States Patent
Kahn

(10) Patent No.: US 7,114,169 B1
(45) Date of Patent: Sep. 26, 2006

(54) GEOGRAPHICALLY SPECIFIC SIGNAL COMMUNICATIONS RECEIVER

(75) Inventor: Michael R. Kahn, West Ampton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/541,016

(22) Filed: Mar. 31, 2000

(51) Int. Cl.
*H04N 7/025* (2006.01)

(52) U.S. Cl. .......................................... 725/33; 725/32

(58) Field of Classification Search .................. 725/33; 348/468
See application file for complete search history.

(56) References Cited

U.S. PATENT DOCUMENTS

| | | | | |
|---|---|---|---|---|
| 3,993,955 | A * | 11/1976 | Belcher et al. | 725/33 |
| 5,121,430 | A * | 6/1992 | Ganzer et al. | 380/258 |
| 5,565,909 | A * | 10/1996 | Thibadeau et al. | 725/35 |
| 5,701,161 | A * | 12/1997 | Williams et al. | 348/468 |
| 5,848,396 | A * | 12/1998 | Gerace | 705/10 |
| 5,937,329 | A * | 8/1999 | Helmy et al. | 725/68 |
| 6,052,556 | A * | 4/2000 | Sampsell | 725/133 |
| 6,177,873 | B1 * | 1/2001 | Cragun | 340/601 |
| 6,204,761 | B1 * | 3/2001 | Vanderable | 340/539.28 |
| 6,583,825 | B1 * | 6/2003 | Yuen et al. | 348/731 |
| 2003/0208756 | A1 * | 11/2003 | Macrae et al. | 725/34 |

FOREIGN PATENT DOCUMENTS

FR EP0912053 A1 * 4/1999

OTHER PUBLICATIONS

National Weather Service; NOAA Weather Radio (NWR) Transmitters; NWR Specific Area Message Encoding; NWR Same (Jul. 13, 1999).*
European Search Report; Jun. 28, 2002.

* cited by examiner

*Primary Examiner*—Chris Kelley
*Assistant Examiner*—Johnny Ma
(74) *Attorney, Agent, or Firm*—RatnerPrestia

(57) ABSTRACT

A geographically specific signal communication receiver in a television receiver that selects one or more messages or warnings that are of interest for display by the television screen from a group that includes other messages or warnings that are not of interest. Each message or warning has an associated code that is compared with one or more codes stored in the receiver and when there is a match between the received code and the stored code, the received message or warning associated with the matched received code is passed to a video display for presentation.

12 Claims, 8 Drawing Sheets

GEOGRAPHICALLY SPECIFIC SIGNAL COMMUNICATIONS RECEIVER

TECHNICAL FIELD

The present invention relates, in general, to broadcasting warnings such as weather conditions and, in particular, to a warning system receiver for receiving warnings pertinent to the geographic area in which the warning system receiver is located.

BACKGROUND OF THE INVENTION

Several warning methods for alerting populations to weather, emergencies and civil disasters are in use at the present time. Shortcomings and deficiencies of those considered below are indicated.

Television stations superimpose messages on normal programming or interrupt normal programming to advise their viewers of severe weather conditions. One major deficiency of this warning method is that the region of coverage of the typical local television station (i.e., the region over which the signals transmitted by the local television station are received) is so extensive that the severe weather condition warnings are received in areas within the region of coverage that are not exposed to and will not be affected by the severe weather conditions being reported by the local television station. At best, this is a nuisance to those individuals who hear the alerts but are not, and will not be, affected by the severe weather conditions being reported. Also, this warning method requires that the television receivers be turned on, actively watched, and tuned to a local television station that is broadcasting the severe weather condition warning for the warning to be received and viewed.

Another example of a warning system currently in use many communities to warn residents of emergencies is a controlled siren, commonly referred to as a civil defense or air raid siren. Such systems are susceptible to mechanical breakdowns and must be taken out of service periodically for routine maintenance. Also, such systems are ineffective to give warnings to those located out of range of the sirens.

Yet another example of a warning method currently in use in many communities is police and fire departments patrolling the streets and announcing warnings or emergencies over loudspeakers. This method is ineffective when the warning message from the loudspeaker is not heard by those located out of range of the loudspeaker or the warning message is drowned out by weather noise or interfering noise levels in the residences where the warnings are intended to be received by individuals situated in the residences.

In a special purpose warning system, currently in use by the National Weather Service, continuing weather bulletins are broadcast on a VHF frequency front transmitters of the National Weather Service. Whenever severe weather threatens, an alert is broadcast that triggers an audible alarm in special receivers, such as the weather radio units available from Tandy Corporation. Because the coverage areas of the broadcast stations usually are quite large (i.e., a National Weather Service facility can cover and be responsible for as many as ten to twenty counties), it is possible, as with the broadcasting of severe weather condition warnings by local television stations, to receive alerts on a receiver in an area to which the alerts have no actual significance. Again, at best, this is a nuisance to those individuals who hear the alerts but are not, and will not be, affected by the severe weather conditions being reported. Additionally, when an alert is triggered in such a receiver, it must be muted manually by the user because the system does not have a broadcast "all clear" signal.

U.S. Pat. No. 5,121,430 describes and illustrates a system designed to overcome the shortcomings identified above of the special purpose warning system described above. The system described in U.S. Pat. No. 5,121,430, however, requires extra, specially designed equipment dedicated to the single purpose of receiving and processing the transmitted warning signals.

SUMMARY OF THE INVENTION

It is an objective of the present invention to provide a new an improved signal communication receiver for receiving warnings of conditions in the region in which the receiver is located.

It is another objective of the present invention to provide a new and improved signal communication receiver that is geographically specific in receiving warnings of conditions in the region in which the receiver is located.

A geographically specific signal communication receiver, constructed in accordance with the present invention, includes first receiving means for receiving a warning signal having information relating to a condition in a geographically specific region and a code component associated with the geographically specific region. This geographically specific signal communication receiver also includes means for storing code information associated with a geographic region of interest, means for comparing the stored code information and the code component of the warning signal and means for developing a control signal when the stored code information and the code component of the warning signal are the same. A geographically specific signal communication receiver, constructed in accordance with the present invention, further includes second receiving means for receiving the warning signal and a television program signal having a video information component and an audio information component, conducting the video information component of the television program signal to a video display and the audio information component of the television program signal to a speaker, and selectively conducting, in response to the control signal, the information relating to a condition in the geographically specific region of the warning signal to the video display.

Although the present invention will be described in connection with the transmission and reception of severe weather condition reports issued by the National Weather Service, it will be apparent that the present invention has broader application and can be used to receive and display other types of messages or warnings that are transmitted with codes associated with geographic regions.

DETAILED DESCRIPTION OF THE INVENTION

Starting in 1985, the National Weather Service began experimenting with the insertion of special digital codes at the beginning and the end of messages about a life or property-threatening event. The intent was to ultimately transmit a code with the initial broadcast of National Weather Radio messages. This system evolved into what is known today as National Weather Radio Specific Area Message Encoding (NWR SAME). The technical specifications of NWR SAME have been published and widely circulated. As indicated by FIG. 1, a SAME receiver is included in a geographically specific signal communication receiver constructed in accordance with the present invention to provide this geographically specific signal communication receiver with the capability of receiving and processing NWR SAME warning signal transmissions from which only those warning signals applicable to the region or regions of interest (i.e., the region in which the geographically specific signal communication receiver is located or a nearby region) are selected and conducted to a display unit to display the warnings.

Figure 1:
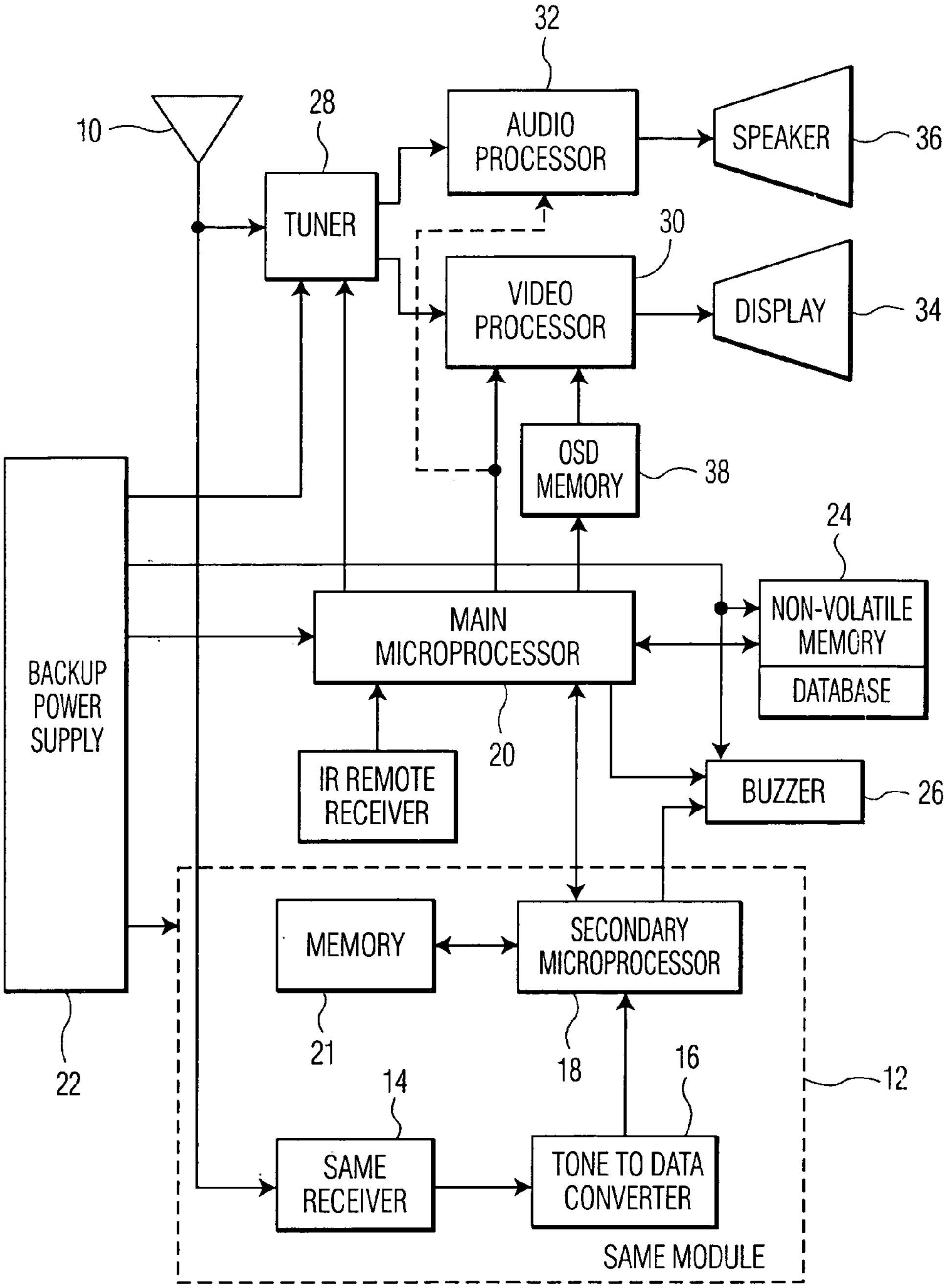
FIG. 1 is a block diagram of a geographically specific signal communication receiver, constructed in accordance with the present invention.

Referring to FIG. 1, a geographically specific signal communication receiver, constructed in accordance with the present invention, includes first receiving means for receiving a warning signal having information relating to a condition in a geographically specific region and a code component associated with the geographically specific region. Such means include, for the embodiment of the invention illustrated by FIG. 1, an antenna 10 that can pick up both the warning signal and a television program signal having a video information component and an audio information component. Separate antennae, one for receiving only the warning signal and one for receiving only the television program signals can be used as an alternative to a single antenna that receives both signals.

The warning signal picked up by antenna 10 is conducted to and received by a SAME MODULE 12 as illustrated by FIG. 1, SAME MODULE 12 includes a SAME RECEIVER 14 that receives and demodulates the warning signal and creates tone signals representative of the information contained in the warning signal. The tone signals are conducted to a TONE TO DATA CONVERTER 16 that converts the tone signals to data signals, typically in binary form, that are conducted to a SECONDARY MICROPROCESSOR 18.

SECONDARY MICROPROCESSOR 18 conducts the output data signals from TONE TO DATA CONVERTER 16 to a MAIN MICROPROCESSOR 20, the function of which will be explained below. Also included in the SAME MODULE 12 illustrated in FIG. 1 is a MEMORY 21 that supports SECONDARY MICROPROCESSOR 18 in the same manner that other memory circuits support other microprocessors.

In the event of a power failure, a BACKUP POWER SUPPLY 22 provides power to SAME MODULE 12, namely to all the units in the SAME MODULE. BACKUP POWER SUPPLY 22 also provides power to other units in the receiver illustrated in FIG. 1 in the event of a power failure, namely MAN MICROPROCESSOR 20, a NON-VOLATILE MEMORY/DATABASE 24, a BUZZER 26, and a TUNER 28 each of which will be considered in greater detail below.

Figure 9:
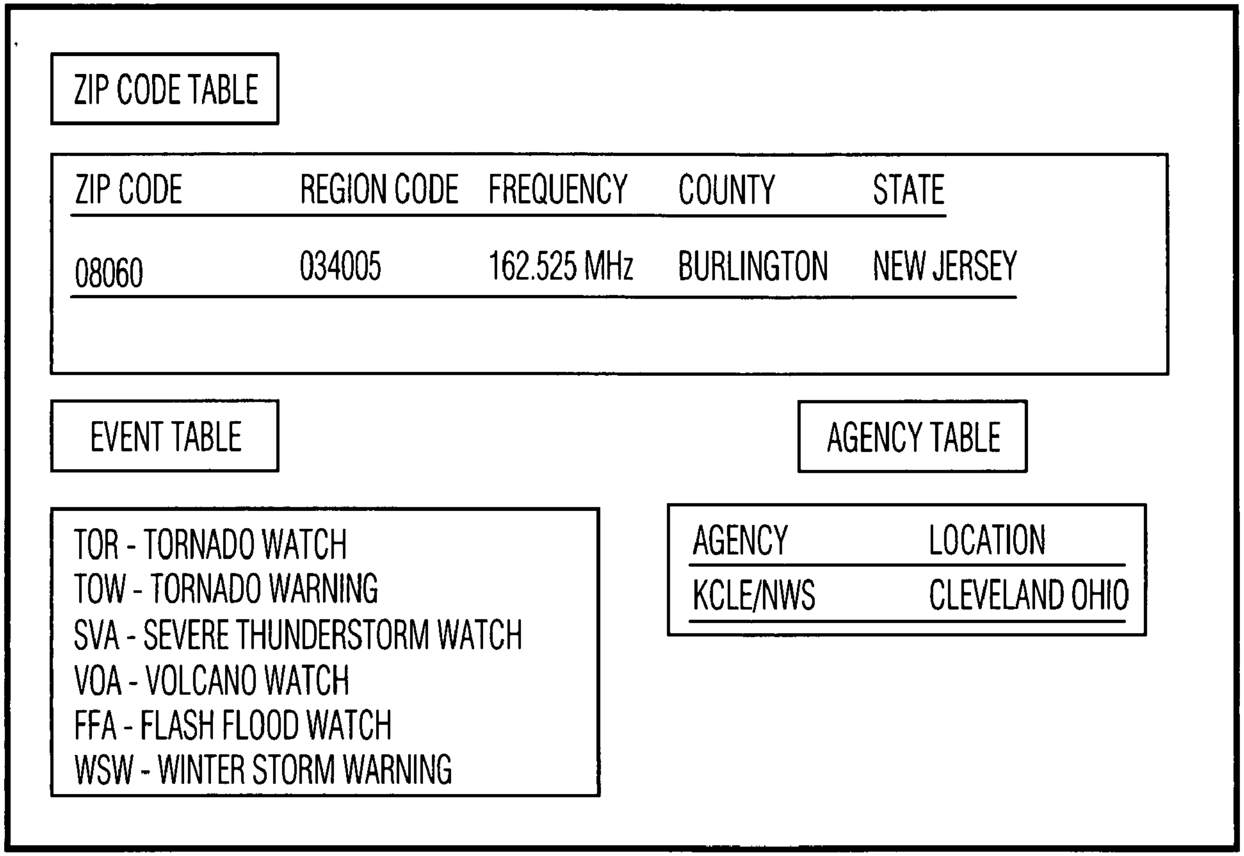
FIG. 9 represents typical information displayed by the ADVANCED SETUP SCREEN of FIG. 3, the REGIONS SETUP SCREEN of FIG. 5 and the WARNINGS SETUP SCREEN of FIG. 7 that is associated with the region selected for warnings displays.

A geographically specific signal communication receiver, constructed in accordance with the present invention, also includes means for storing code information associated with a geographic region of interest and other information related to the region of interest. The region of interest can be the region in which the geographically specific signal communication receiver is located (i.e., the region in which the user of this receiver is located) or a nearby region (i.e., the region in which a family member or a friend is located or the location of a business or other residence of interest to the user). A geographically specific signal communication receiver, constructed in accordance with the present invention, can store more than one code associated with a geographic region of interest and related information. Such code storage and information storage means include, for the embodiment of the present invention illustrated by FIG. 1, NON-VOLATILE MEMORY/DATABASE 24. FIG. 9 represents typical information related to the region of interest that is stored by NON-VOLATILE MEMORY/DATABASE 24 and that is displayed by the present invention. A given region includes a number of zip code areas. When a zip code of interest is identified by the user, the region containing the identified zip code area is, in run, identified by NON-VOLATILE MEMORY/DATABASE 24.

The FIG. 1 geographically specific signal communication receiver further includes means for comparing the stored code information and the code component of the warning signal. Such means, for the embodiment of the present invention illustrated in FIG. 1, are included in MAIN MICROPROCESSOR 20. When the stored code information (i.e., the code associated with the region identified by NON-VOLATILE MEMORY/DATABASE 24) and the code component of the warning signal are the same, MAIN MICROPROCESSOR 20 develops a control signal.

It should be noted that, for the embodiment of the present invention illustrated by FIG. 1, the information contained in warning signals other than the one or more that might be of interest (i.e., the region or regions corresponding to the code stored in NON-VOLATILE MEMORY/DATABASE 26) are conducted to MAIN MICROPROCESSOR 20 where all but the one or more of interest are eliminated or discarded because of a lack of a match with the stored code or codes. It will be understood that such selection of the warning signal information of interest (i.e., comparison of the codes carried by the warning signals with the stored code) can be carried out earlier in the signal processing of the warning signal, for example in SECONDARY MICROPROCESSOR 18. In such an arrangement, SECONDARY MICROPROCESSOR 18 scans all incoming warnings and only the one or ones of interest are conducted to MAIN MICROPROCESSOR 20.

MAIN MICROPROCESSOR 20 also serves to control the nature of the warning signal information that is to be conducted to the MAIN MICROPROCESSOR 20 by SECONDARY MICROPOROCESSOR 18. MAIN MICROPROCESSOR 20 can program SECONDARY MICROPROCESSOR 18 to conduct, for example, only warning information about tornadoes.

A geographically specific signal communication receiver, constructed in accordance with the present invention, further includes second receiving means for receiving the warning signal and a television program signal having a video information component and an audio information component, conducting the video information component of the television program signal to a video display and the audio information component of the television program signal to a speaker, and selectively conducting, in response to the control signal developed by MAIN MICROPROCESSOR 20, the information relating to a condition in the geographically specific region of the warning signal to the video display. Such means include, for the embodiment of the invention illustrated in FIG. 1, a TUNER 28 that receives both the warning signal and the television program signal from antenna 10. TUNER 28 is designed to be frequency selective in passing both the warning signal and the video information component of the television program signal to a VIDEO PROCESSOR 30 and the audio information component of the television program signal to an AUDIO PROCESSOR 32.

VIDEO PROCESSOR 30 serves to pass the video information component of the television program signal to a VIDEO DISPLAY 34 in the usual way where the video information component of the television program signal is displayed in the usual manner. AUDIO PROCESSOR 32 serves to pass the audio information component of the television program signal to a SPEAKER 36 in the usual way where the audio information component of the television program signal is broadcast in the usual manner.

In addition to processing the video information component of the television program signal, VIDEO PROCESSOR 30, in accordance with the present invention, serves two important functions in connection with the warning signal. First, VIDEO PROCESSOR 30, in response to the control signal developed by MAIN MICROPROCESSOR 20 when the code information included in the warning signal information is the same as the stored code information, permits passage of the video information of the waning signal to VIDEO DISPLAY 34. Second, VIDEO PROCESSOR 30 determines the manner in which the warning signal information is to be displayed by VIDEO DISPLAY 34, for example a footer, or a split-screen, or interruption of a television program, etc. The signals representative of the particular characters included in a video display of the warning are supplied from an OSD (ON SCREEN DISPLAY) MEMORY 38 that is controlled by MAIN MICROPROCESSOR 20.

The control signal developed by MAIN MICROPROCESSOR 20 when the code information included in the warning signal information matches the stored code information, along with an input from SECONDARY MICROPROCESSOR 18, serve to actuate BUZZER 26 to provide an audible alarm that warning information, specific to the region or regions of interest has been received and the user can then turn his or her attention to VIDEO DISPLAY 34 to view the warning.

It should be noted that the warning signal can have information relating to a condition in the geographically specific region in audio form as well as video form. In such a case, MAIN MICROPROCESSOR 20, controls AUDIO PROCESSOR 32 to pass the audio information relating to a condition in the geographically specific region of the warning signal to SPEAKER 36.

Preferably, a geographically specific signal communication receiver, constructed in accordance with the present invention, is arranged to be in an "always ON" or "STANDBY" condition to receive warning signals. Typically, a digital television receiver is "always ON" monitoring information that is being transmitted continuously. Consequently, digital television receivers are ideally suited for the present invention.

Figure 2:
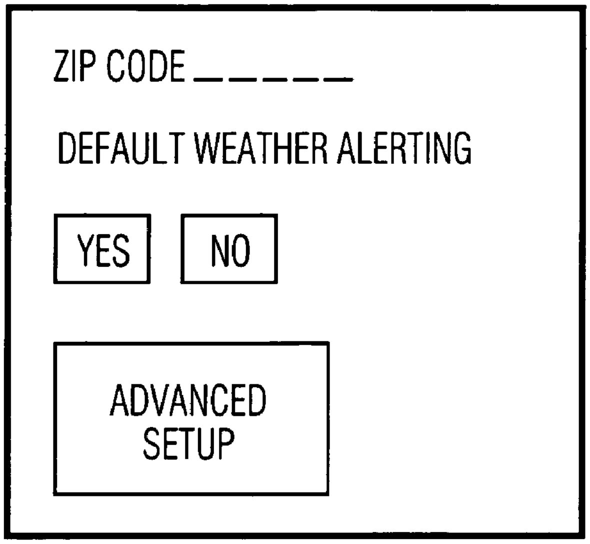
FIG. 2 shows a BASIC SETUP SCREEN useful in practicing the present invention.

Referring to FIG. 2, which shows a BASIC SETUP SCREEN, the user enters the zip code corresponding to the region of interest for which warnings are to be received and displayed. Preferably, the zip code and other information entered in this screen, and other screens described below, is entered by using a remote control unit, After entering the zip code, the user activates "YES" to be alerted for warnings. Then the user will activate "ADVANCED SETUP" to condition or customize the geographically specific signal communication receiver and its operation with certain features that are described below.

Figure 3:
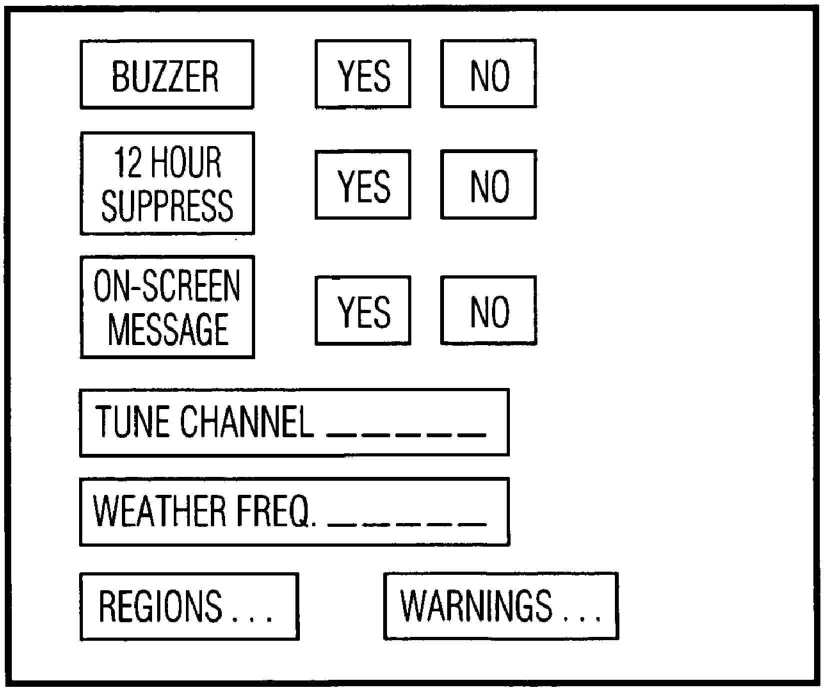
FIG. 3 shows an ADVANCED SETUP SCREEN useful in practicing the present invention.
Figure 4:
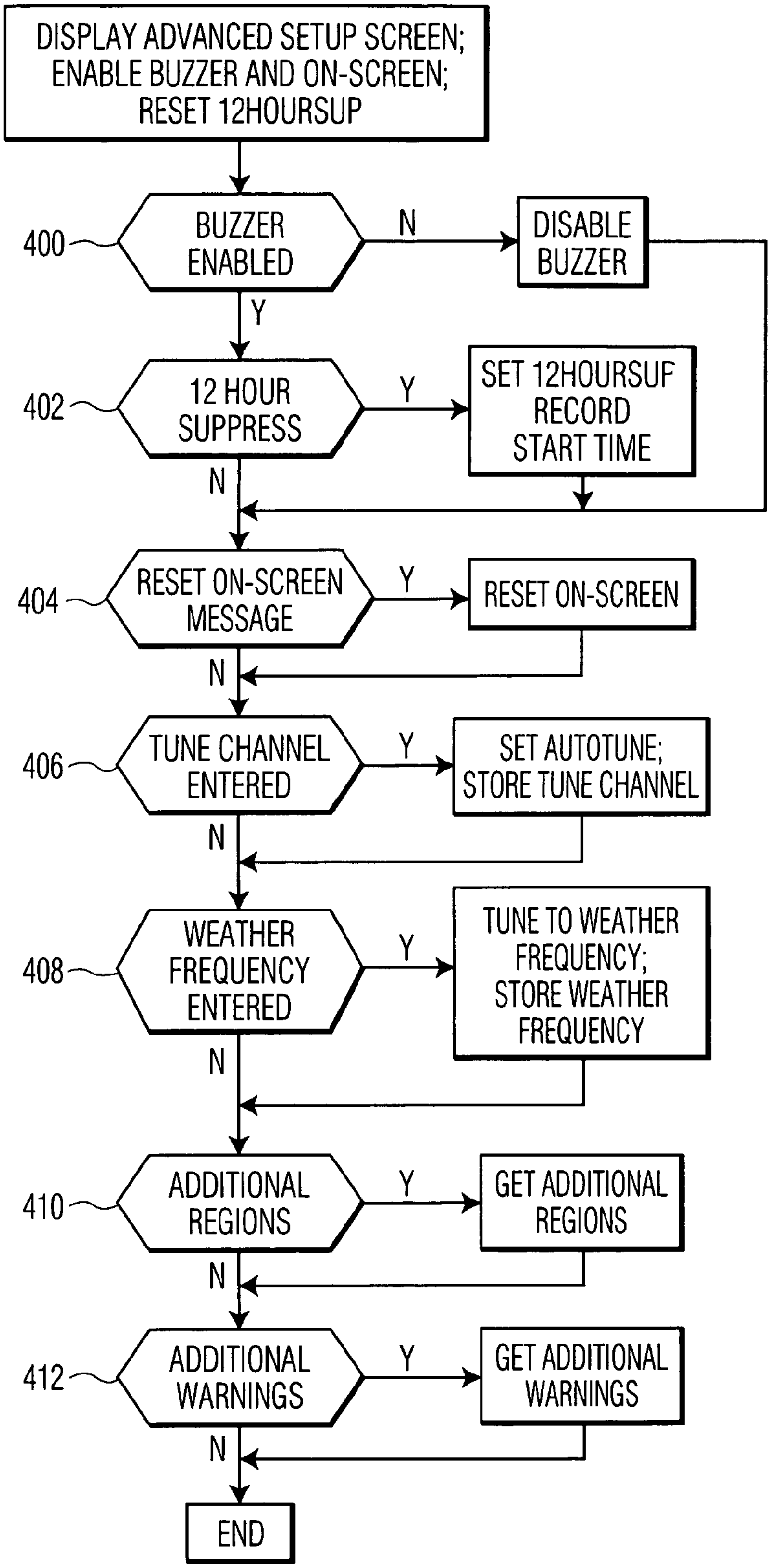
FIG. 4 is a flowchart that describes the steps in conditioning the present invention and its operation with the features that are displayed on the ADVANCED SETUP SCREEN of FIG. 3.

FIG. 3 shows an ADVANCED SETUP SCREEN used to condition the geographically specific signal communication receiver and its operation with certain features and FIG. 4 is a flowchart that describes the steps in conditioning the geographically specific signal communication receiver and its operation with the features that are displayed on the ADVANCED SETUP SCREEN. The user activates "YES" or "NO" for the first three entries on the ADVANCE SETUP SCREEN of FIG. 3 depending on whether the tree features are or are not desired. First is the option of using or not using BUZZER 26 as shown by step 400 BUZZER ENABLED in FIG. 4. The next option, as shown by step 402 12 HOUR SUPPRESS, is to silence BUZZER 26 for a period of time, such as twelve hours, once a warning is acknowledged, so that the user is not bothered constantly by warnings that are transmitted repeatedly. The warnings are not disabled permanently should the user forget that BUZZER 26 has been disabled. The suppress option is applicable only when BUZZER 26 is in use. The third option, as shown by step 404 RESET ON-SCREEN MESSAGE, is to display or not display the warning message on DISPLAY 34.

The next option on the ADVANCED SETUP SCREEN, as shown by step 406 TUNE CHANNEL ENTERED, is to enter the television channel on which the user wishes to display the warnings. The user typically would enter the local weather channel or a news channel in this field. The geographically specific signal communication receiver automatically tunes to this channel upon reception of a warning for a region of interest to the user.

The remaining entries on the ADVANCED SETUP SCREEN display, made at the option of the user, include information derived from NON-VOLATILE MEMORY/DATABASE 24 when the zip code is entered in the FIG. 2 BASIC SETUP SCREEN display. Examples of such information are shown in FIG. 9. As shown by step 408 WEATHER FREQUENCY ENTERED, the user can set the Weather Radio Frequency. As shown by step 410 ADDITIONAL WARNINGS, the user can enter additional regions of interest. As shown by step 412 ADDITIONAL WARNINGS, the user can enter additional types of warnings.

Figure 5:
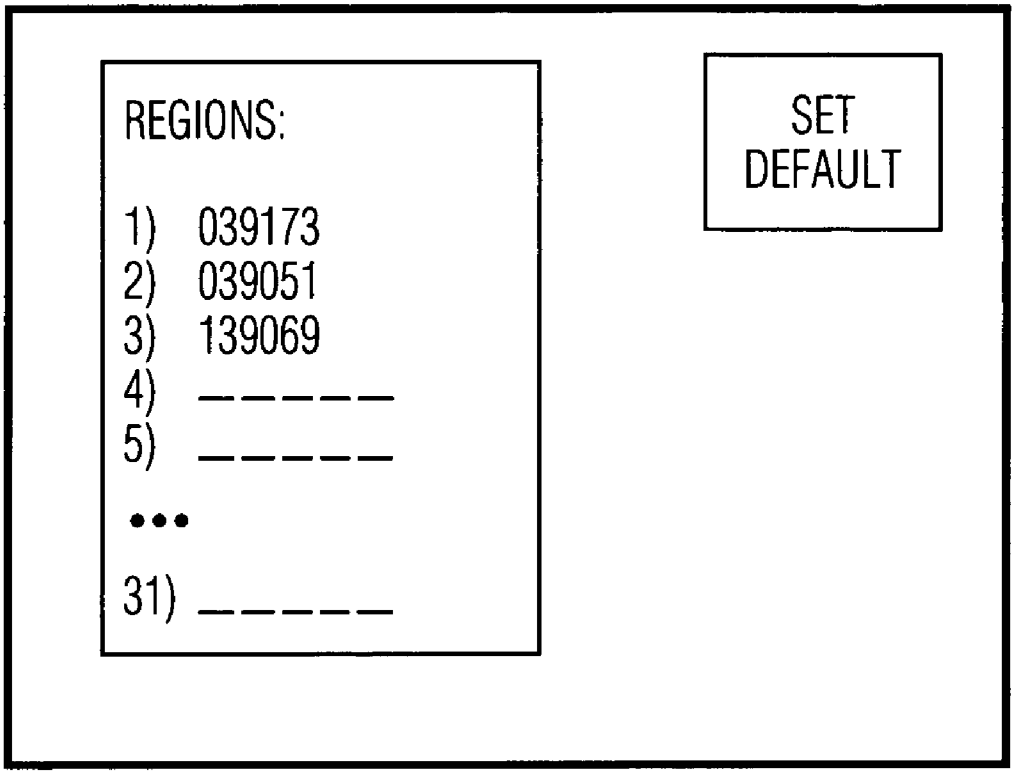
FIG. 5 shows a REGIONS SETUP SCREEN useful in practicing the present invention.
Figure 6:
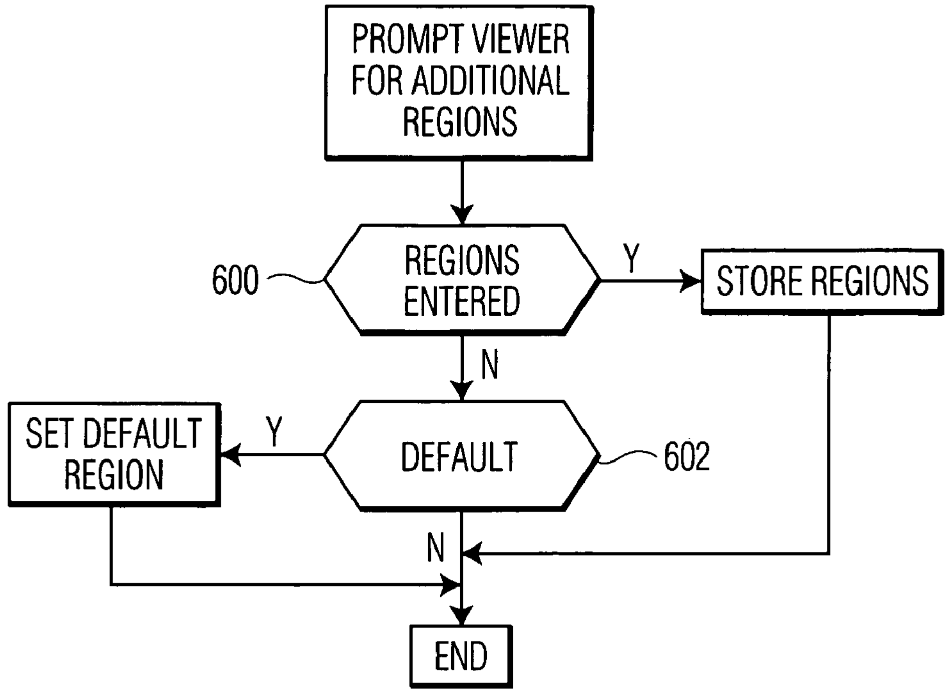
FIG. 6 is a flowchart that describes the steps in conditioning the present invention and its operation with the features that are displayed on the REGIONS SETUP SCREEN of FIG. 5.

FIG. 5 shows a REGIONS SETUP SCREEN used to enter the region or regions of interest and FIG. 6 is a flowchart that describes the steps in conditioning the geographically specific signal communication receiver and its operation with the region or regions of interest that are displayed on the REGIONS SETUP SCREEN. The identification of a region is derived from NON-VOLATILE MEMORY/DATABASE 24 when the zip code is entered in the FIG. 2 BASIC SETUP SCREEN display. Again, such information is shown in FIG. 9. Starting with step 600 REGIONS ENTERED, the user has the option of storing all the regions of interest or proceeding to step 602 DEFAULT and eliminate those regions that are not of interest.

Figure 7:
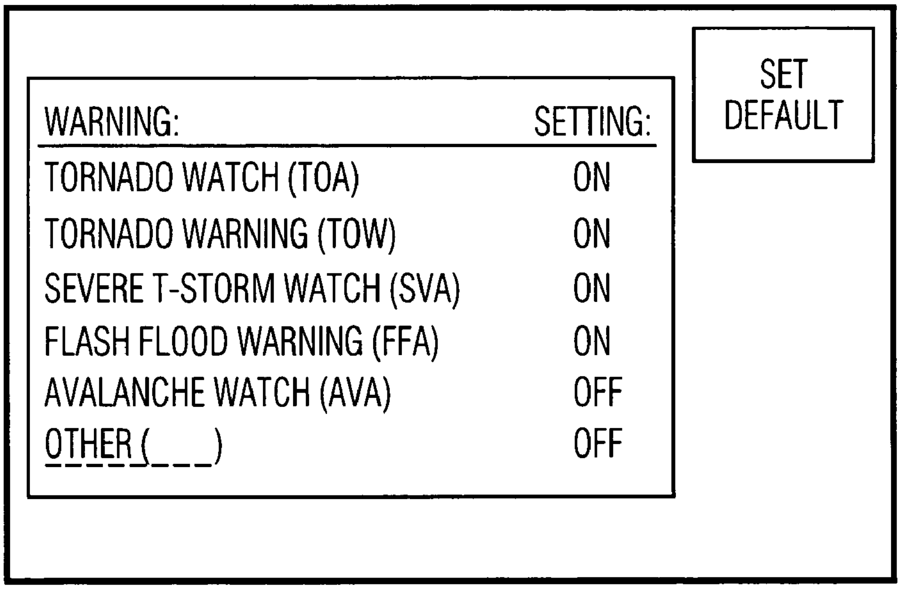
FIG. 7 shows a WARNINGS SET UP SCREEN useful in practicing the present invention.
Figure 8:
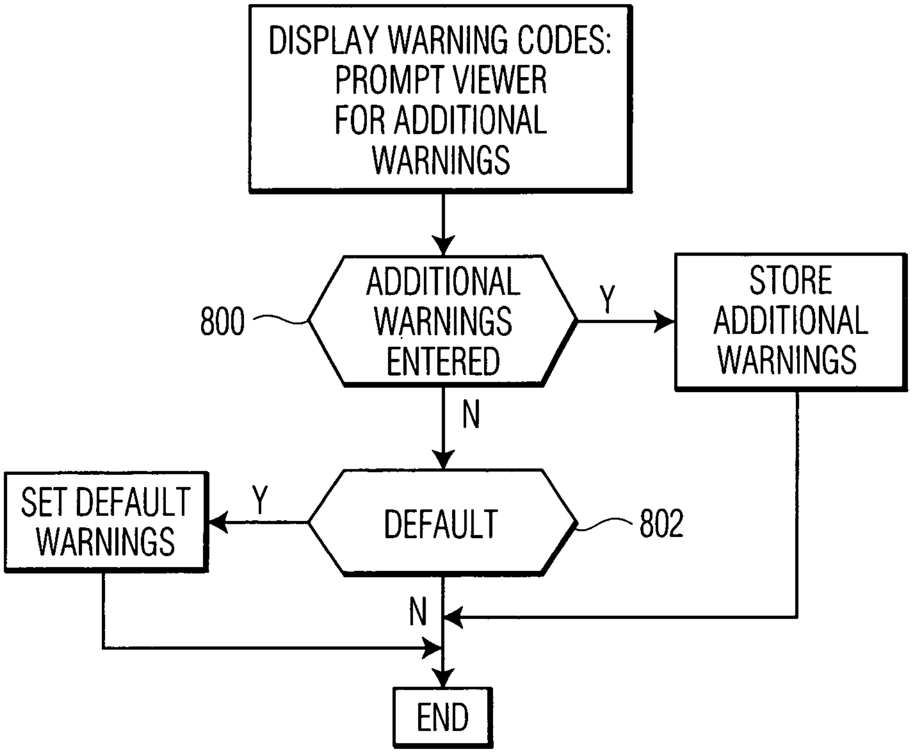
FIG. 8 is a flowchart that describes the steps in conditioning the present invention and its operation with the features that are displayed on the WARNINGS SETUP SCREEN of FIG. 7.

FIG. 7 shows a WARNINGS SETUP SCREEN used to enter the warning or warnings of interest and FIG. 8 is a flowchart that describes the steps in conditioning the geographically specific signal communication receiver and its operation with the warning or warnings of interest that are displayed on the WARNINGS SETUP SCREEN. The identification of a warning is derived from NON-VOLATILE MEMORY/DATABASE 24 when the zip code is entered in the FIG. 2 BASIC SETUP SCREEN display. Again, such information is shown in FIG. 9. Starting with step 800 ADDITIONAL WARNINGS ENTERED, the user has the option of storing all the warnings of interest or proceeding to step 602 DEFAULT and eliminate those warnings that are not of interest FIG. 9 represents typical information in NON-VOLATILE MEMORY/DATABASE 24 that corresponds to the zip code that has been entered in the FIG. 2 BASIC SETUP SCREEN display. Once the zip code has been entered, this information is provided to the FIG. 3 ADVANCED SETUP SCREEN, the FIG. 7 REGIONS SETUP SCREEN, and the FIG. 7 WARNINGS SETUP SCREEN.

Figure 10:
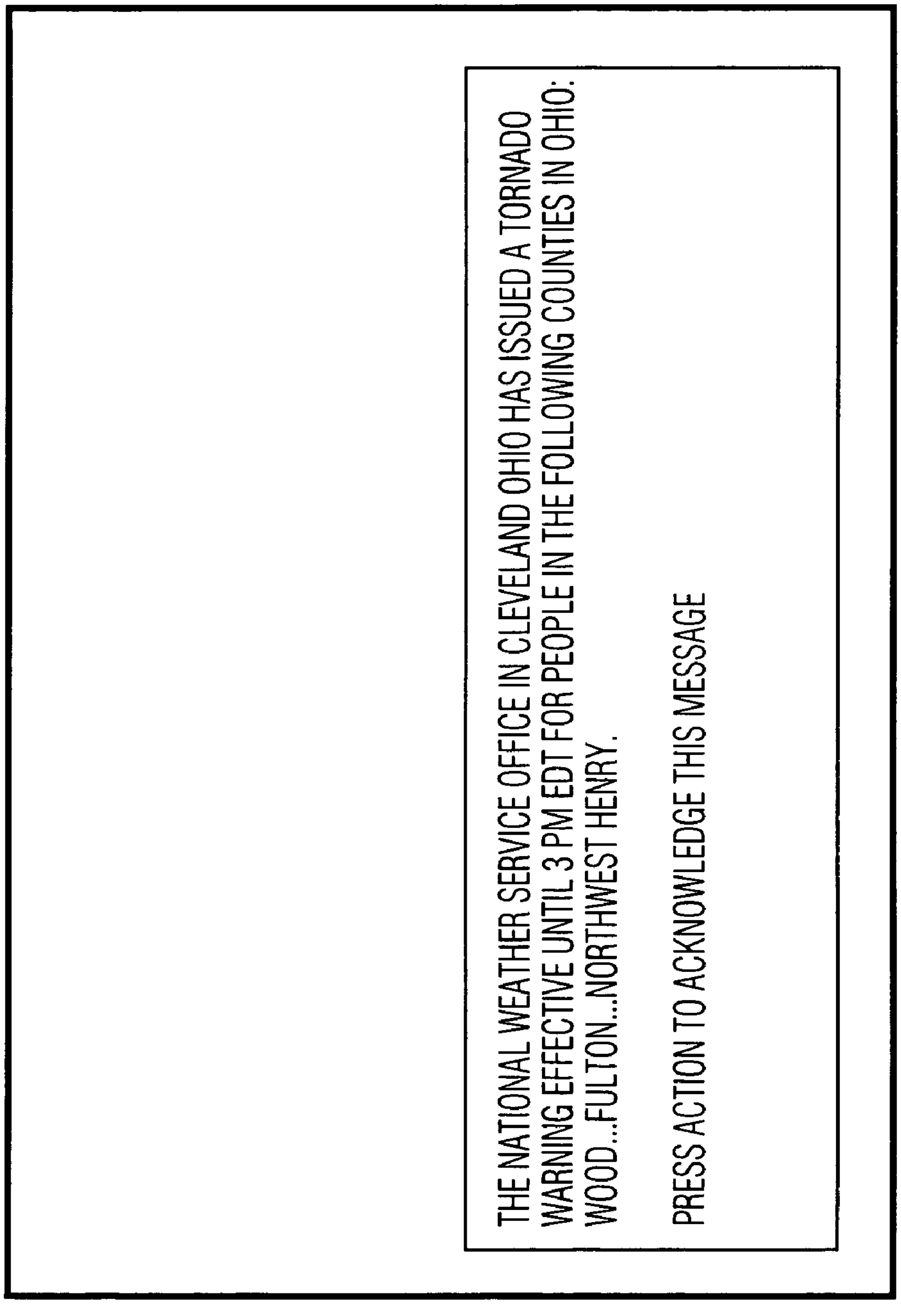
FIG. 10 is an example of a screen display of a warning.

FIG. 10 is an example of a screen display of a warning. In this example, the warning is displayed as a footer.

While in the foregoing there have been described preferred embodiments of the present invention, it should be understood by those skilled in the art that various modifications and changes can be made without departing from the true spirit and scope of the present invention.

What is claimed is:

1. A geographically specific signal communication receiver, comprising:

a receiver integral to a television receiver for receiving a warning signal, the warning signal being independent of any television signal, the warning signal having:

(a) information relating to a condition in a geographically specific region, and (b) a code component associated with the geographically specific region;

a secondary microprocessor, coupled to the receiver, for receiving the warning signal from the receiver and selectively providing the code component and the information relating to the condition as digital data;

a memory for storing code information associated with multiple geographic regions of interest;

a main microprocessor, coupled to the memory, for programming the secondary microprocessor to selectively provide the code component and the information relating to the condition, for receiving the selectively provided code component and information relating to the condition, for comparing the stored code information and the selectively provided code component of the warning signal and for developing a control signal when the stored code information and the selectively provided code component of the warning signal are the same;

an audible alarm coupled directly to the main microprocessor and to the secondary microprocessor for developing an audible alarm when the warning signal is received;

a tuner for:

(a) receiving a television program signal having a video information component and an audio information component, and (b) conducting the video information component of the television program signal to a video processor and the audio information component of the television program signal to an audio processor, wherein the video processor is responsive to the control signal for determining a manner in which the received warning signal is displayed, the video processor being configured to selectively cause the message to be displayed as a footer on a displayed video image or as a display that interrupts television programming, and for selectively conducting, in response to the control signal, the information relating to the condition in the geographically specific region as a formatted warning signal to the video display.

2. A geographically specific signal communication receiver comprising:

an antenna for receiving:

(a) a television program signal having a video information component and an audio information component; and (b) a warning signal, the warning signal being independent of any television signal, and having:

(1) information relating to a condition in a geographically specific region, and (2) a code component associated with the geographically specific region;

a receiver coupled to the antenna and integral to a television receiver for receiving the warning signal;

a secondary microprocessor, coupled to the receiver for receiving the warning signal from the receiver and selectively providing the code component and the information relating to the condition as digital data;

a memory for storing a plurality of code information values associated with a respective plurality of geographic regions of interest;

a main microprocessor, coupled to the memory, for programming the secondary microprocessor to selectively provide the code component and the information relating to the condition, for receiving the selectively provided code component and information relating to the condition, for comparing the stored plurality of code information values and the selectively provided code component of the warning signal and for developing a control signal when at least one of the stored plurality of code information values and the selectively provided code component of the warning signal are the same;

an audible alarm coupled directly to the main microprocessor and to the secondary microprocessor for developing an audible alarm when the warning signal is received;

a tuner for:

(a) receiving the television program signal, (b) conducting the video information component of the television program signal to a video processor and the audio information component of the television program signal to an audio processor, wherein, the video processor is responsive to the control signal for determining a manner in which the received warning signal is displayed and for selectively conducting, in response to the control signal, the information relating to the condition in the geographically specific region of the formatted warning signal to the video display.

3. A geographically specific signal communications receiver according to claim 1, wherein said receiver is a Specific Area Message Encoding module and said secondary microprocessor controls said Specific Area Message Encoding module to develop data signals representative of the condition and the code component.

4. A geographically specific signal communications receiver according to claim 1, wherein the warning signal includes information relating to a condition in a geographically specific region in audio form and said audio processor selectively conducts the audio warning signal to a speaker in response to the control signal developed by said main microprocessor.

5. A geographically specific signal communications receiver according to claim 2, wherein the code component of the warning signal and the stored plurality of code information values are postal codes.

6. A method of receiving and displaying warning signals using a warning signal receiver coupled to a television receiver, the method comprising the steps of:

receiving the warning signal in a first format, the warning signal including information relating to a condition in a geographically specific region and a code component associated with the geographically specific region;

programming a secondary microprocessor with a main microprocessor to selectively provide the warning signal to the main microprocessor;

selectively providing the warning signal to the main microprocessor in a second format under control of the secondary microprocessor;

storing in a memory at least one code corresponding to a geographic region of interest for which warning signals are to be received, formatted, and displayed and a channel to which the television receiver is to be tuned when a warning signal is received;

comparing, by said main microprocessor, the code component of the warning signal in the second format to the at least one code stored in the memory;

determining if an audible alarm coupled directly to the main microprocessor and to the secondary microprocessor in said television receiver has been temporarily suppressed and, if the audible alarm has not been temporarily suppressed, conditioning the audible alarm to indicate reception of a warning signal responsive to the main microprocessor or the secondary microprocessor, wherein the main microprocessor and the secondary microprocessor are both configured to control the audible alarm;

conditioning a video display in said television receiver to display a formatted warning signal, responsive to a control signal from the main microprocessor;

setting a tuner of said television receiver to the stored television channel responsive to the control signal from the main microprocessor;

causing said television receiver to display at least one selected type of warning signal in a selected manner responsive to the control signal from the main microprocessor.

7. The method of claim 6, wherein the at least one code is a postal code.

8. The method of claim 7, wherein the format for displaying the formatted warning signal is selected from a group consisting of a footer display, a split-screen display, and an interruption of a television program.

9. The geographically specific signal communication receiver according to claim 1, wherein the receiver receives operational power from a power supply of the television receiver when the television receiver is turned off.

10. The geographically specific signal communication receiver according to claim 2, wherein the receiver receives operational power from a power supply of the television receiver when the television receiver is turned off.

11. The geographically specific signal communication receive according to claim 1, further comprising:

means for formatting the received warning signal includes means for displaying the formatted warning as a footer display, a split-screen display, and an interruption of a television program.

12. The geographically specific signal communication receive according to claim 2, further comprising:

means for formatting the received warning signal includes means for displaying the formatted warning as a footer display, a split-screen display, and an interruption of a television program.

* * * * *